United States Patent
Lim

(10) Patent No.: US 12,442,711 B2
(45) Date of Patent: Oct. 14, 2025

(54) FAULT DETECTION SYSTEM FOR VACUUM PUMP

(71) Applicant: Enssel Inc., Seoul (KR)

(72) Inventor: Yong-Il Lim, Seoul (KR)

(73) Assignee: ENSSEL INC., Seoul (KR)

( * ) Notice: Subject to any disclaimer, the term of this patent is extended or adjusted under 35 U.S.C. 154(b) by 404 days.

(21) Appl. No.: 17/959,824

(22) Filed: Oct. 4, 2022

(65) Prior Publication Data

US 2023/0152179 A1 May 18, 2023

(30) Foreign Application Priority Data

Nov. 17, 2021 (KR) .......................... 10-2021-0158811

(51) Int. Cl.
*G01M 1/22* (2006.01)

(52) U.S. Cl.
CPC .................................... *G01M 1/22* (2013.01)

(58) Field of Classification Search
CPC ........ G01H 3/04; G01M 1/22; G01M 13/045; G01M 7/00
See application file for complete search history.

(56) References Cited

U.S. PATENT DOCUMENTS

| | | | | |
|---|---|---|---|---|
| 2004/0143418 A1* | 7/2004 | Ushiku | ................. | G01M 13/00 702/184 |
| 2008/0010030 A1* | 1/2008 | Cheung | ................. | F04D 27/001 702/34 |
| 2010/0300683 A1* | 12/2010 | Looper | ................. | E21B 47/008 166/250.01 |
| 2017/0241422 A1* | 8/2017 | Munk | ................... | F04D 29/669 |

FOREIGN PATENT DOCUMENTS

KR   10-2020-0092187      8/2020

* cited by examiner

*Primary Examiner* — Yoshihisa Ishizuka
(74) *Attorney, Agent, or Firm* — KILE PARK REED & HOUTTEMAN PLLC

(57) ABSTRACT

Disclosed is a fault detection system for a vacuum pump. The fault detection system for a vacuum pump according to an embodiment of the disclosure includes an acoustic sensor configured to detect sounds, generate a sound pattern from the sounds, and collect the sound pattern and a processor configured to analyze the sound pattern and identify whether a vacuum pump is faulty.

4 Claims, 4 Drawing Sheets

FAULT DETECTION SYSTEM FOR VACUUM PUMP

CROSS-REFERENCE TO RELATED APPLICATION(S)

This application claims priority to and the benefits of Korean Patent Application No. 10-2021-0158811 under 35 U.S.C. § 119, filed on Nov. 17, 2021 in the Korean Intellectual Property Office (KIPO), the disclosure of which is incorporated herein by reference in its entirety.

BACKGROUND

1. Technical Field

The disclosure relates to a fault detection system for a vacuum pump, and more specifically, to a fault detection system for a vacuum pump, which is capable of readily managing an abnormal state of the vacuum pump.

2. Description of the Related Art

Vacuum technology is widely used in various industry fields such as not only semiconductors and displays, but also food and medicine, optical coatings, surface science, nano science, nuclear fusion, space science, and the like, and is becoming increasingly important day by day as the degree of integration of semiconductors is increased and advanced technologies such as quantum devices are developed.

A vacuum pump is used to maintain a vacuum state and control the atmosphere and flow of gas. The control of a degree of vacuum is directly related to the productivity of the products. Since a loss of the function of a vacuum pump causes defects of products, it is most important to maintain the performance of the vacuum pump in terms of reliability and economic feasibility of the vacuum pump.

Vacuum pumps are often fully operated 24 hours a day, 365 days a year. In an environment where a vacuum pump is operating, there is a high possibility that the vacuum pump may be readily degraded or broken during operation thereof. The maintenance, repair, and replacement cycles of vacuum pumps are also different depending on the product process and manufacturing apparatus and the average replacement cycle of the vacuum pumps is five to seven years, and thus it is necessary to maintain, repair, and replace the vacuum pumps once or twice a year.

In order to reduce production cost in such a manufacturing environment, it is necessary to verify the vacuum pumps, and considerable effort and technology are required for management thereof. It is most important to monitor and evaluate a degree of weakening of the vacuum pump over time during the manufacturing process, and to prevent a sudden decrease in vacuum level due to sudden stop of the operation of the vacuum pump.

The life expectancy of the vacuum pump also varies depending on an environment in which the vacuum pump is used. For example, in manufacturing processes such as chemical vapor deposition (CVD), etching, and diffusion, powder is generated during a reaction of a process gas, which acts as a factor that impairs vacuum performance, thus there is a need for more careful attention to maintenance and replacement.

In the case of the conventional method, the abnormal state of a vacuum pump is checked by measuring an exhaust speed, inlet pressure, current, consumption pressure, temperature, exhaust pressure, etc. measured while the vacuum pump is operating, or checked by an operator's visual observation or empirical determination on the failure of the operating state such as touch, sound, or the like.

A fault detection system for a vacuum pump, which performs analysis of a vacuum pump replacement cycle or the like according to the conventional method, does not readily provide reliability at the time of the vacuum pump maintenance and replacement cycle selection, and to determine an exact replacement timing because various types of measurement data caused by the operation failure of the vacuum pump were insufficient.

A method of managing a vacuum pump, such as the analysis of the vacuum pump replacement cycle or the like according to the conventional method, has a problem that it is difficult to ensure accuracy in determining whether replacement or maintenance is necessary because each operator determined according to his/her own standards during maintenance and replacement of the vacuum pump.

DOCUMENT OF RELATED ART

Patent Document (Patent Document 0001) Korean Laid-open Patent Application No. 10-2020-0092187 (Published on Aug. 3, 2020)

SUMMARY

The disclosure is directed to providing a fault detection system for a vacuum pump, which is capable of detecting a failure or fault of the vacuum pump to ensure performance and safety of the vacuum pump, and a method of detecting a fault using the same.

The disclosure is also directed to providing a fault detection system for a vacuum pump, which is capable of improving a service life of the vacuum pump, and a method of detecting a fault using the same.

According to an aspect of the disclosure, there is provided a fault detection system for a vacuum pump.

The fault detection system for a vacuum pump may include an acoustic sensor configured to detect sounds, generate a sound pattern from the sounds, and collect the sound pattern and a processor configured to analyze the sound pattern to identify whether a vacuum pump is faulty.

The processor may include an analysis part configured to analyze the sound pattern based on time in a state during operating the vacuum pump to detect a fault of the vacuum pump.

The fault detection system for a vacuum pump may further include a vibration sensor configured to detect vibrations and collect a vibration pattern from the vibrations, and a current sensor configured to measure a current applied to the vacuum pump, wherein the processor includes a fault identification part calling operations of the vibration sensor and the current sensor in case that the sound pattern of the vacuum pump is greater than or equal to a preset threshold value.

The analysis part may track change values of the sound pattern, the vibration pattern, and the current at an arbitrary time period in case that a fault of the vacuum pump is detected.

BRIEF DESCRIPTION OF THE DRAWINGS

The above and other objects, features and advantages of the disclosure will become more apparent to those of ordinary skill in the art by describing embodiments thereof in detail with reference to the accompanying drawings, in which.

DETAILED DESCRIPTION OF THE EMBODIMENTS

Figure 1:
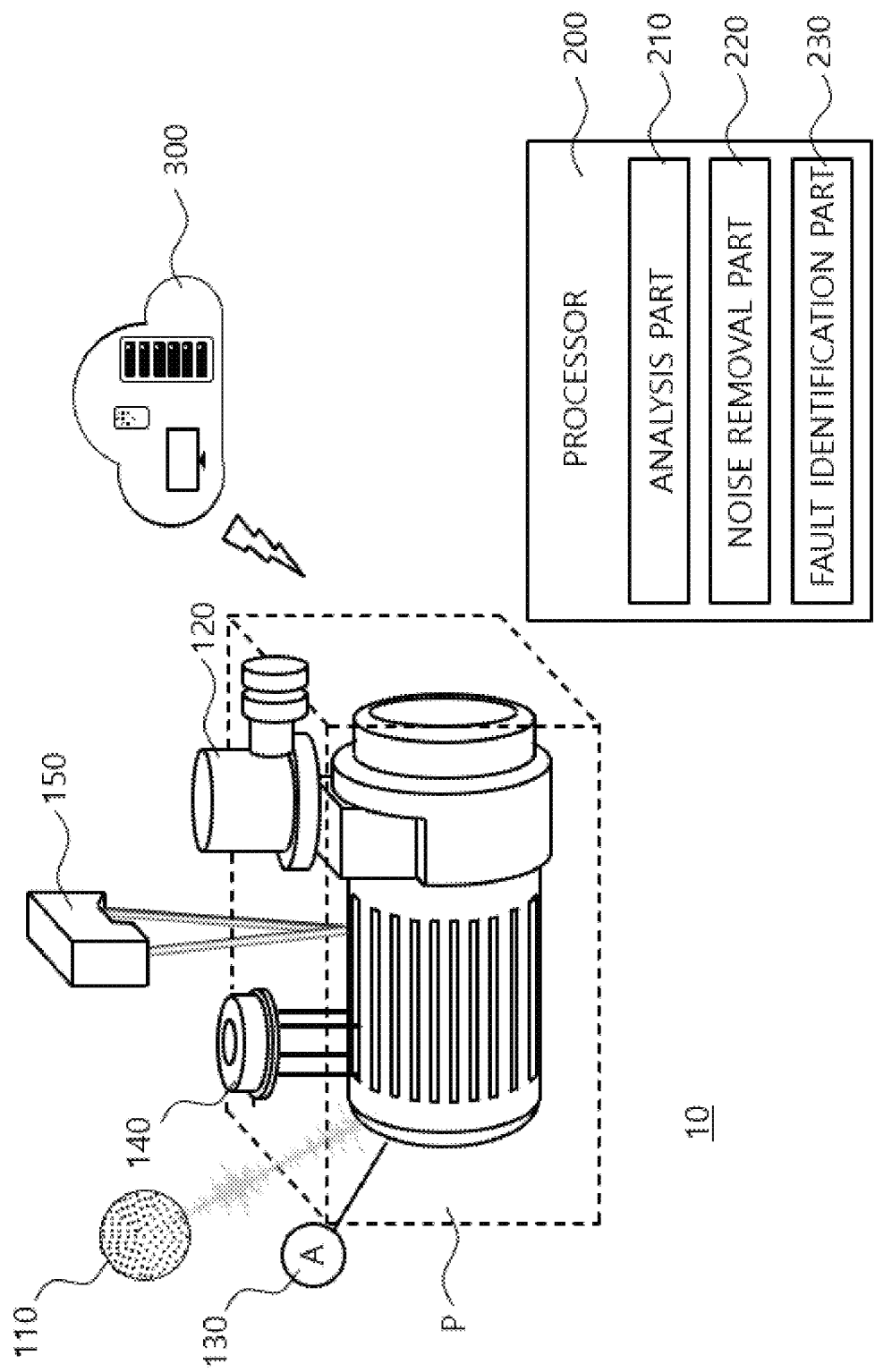
FIG. 1 is a schematic diagram illustrating a fault detection system for a vacuum pump according to an embodiment of the disclosure.

Hereinafter, embodiments of the disclosure will be described in detail with reference to the accompanying drawings. However, the technological scope of the disclosure is not limited to the embodiments described herein, and may be implemented in a different form. The embodiments described herein are provided to thoroughly complete the disclosure and fully convey the concept of the disclosure to those skilled in the art.

In the specification, when an element is referred to as being formed on another element, the description includes the meaning of the first element being directly formed on the second element or the meaning of a third element being interposed between the two elements. In the drawings, the shapes and sizes of elements are exaggerated for effective description of technical content.

In various embodiments of the disclosure, although the terms "first," "second," "third," etc. are used herein to describe various elements, these elements should not be limited by these terms. These terms are only used to distinguish one element from another element. Therefore, an element which is referred to as a first element in any one embodiment may be referred to as a second element in another embodiment. Each embodiment described and illustrated herein also includes a complementary embodiment thereof. Further, in the specification, the term "and/or" is used in a sense that includes at least one of elements listed before and after.

In the specification, the singular forms "a" and "an" are intended to also include the plural forms as well, unless the context clearly indicates otherwise. Further, it should be understood that the terms "comprise," "comprising," "include," and/or "including," when used herein, specify the presence of stated features, integers, steps, elements, or combinations thereof, but do not preclude the presence or addition of one or more other features, integers, steps, elements, or combinations thereof. Further, when an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements.

In the following descriptions of the disclosure, when detailed descriptions of related known functions or configurations are deemed to unnecessarily obscure the gist of the disclosure, the descriptions will be omitted.

Unless otherwise defined or implied herein, all terms (including technical and scientific terms) used have the same meaning as commonly understood by those skilled in the art to which this disclosure pertains. It will be further understood that terms, such as those defined in commonly used dictionaries, should be interpreted as having a meaning that is consistent with their meaning in the context of the relevant art and should not be interpreted in an ideal or excessively formal sense unless clearly defined in the specification.

Figure 2:
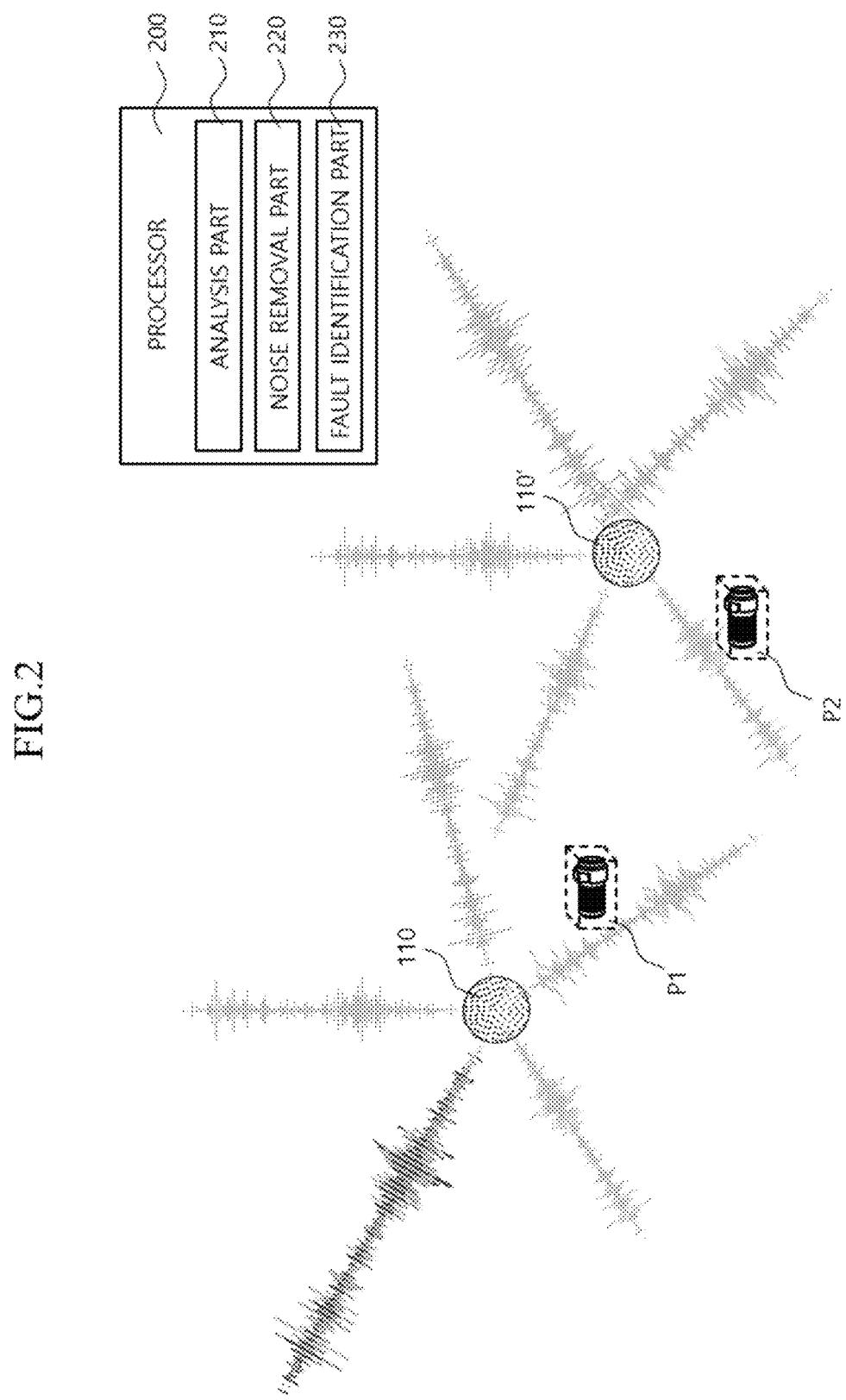
FIG. 2 is a schematic diagram illustrating a method of selecting any one from sound patterns collected by at least two acoustic sensors in a fault detection system for a vacuum pump.
Figure 3:
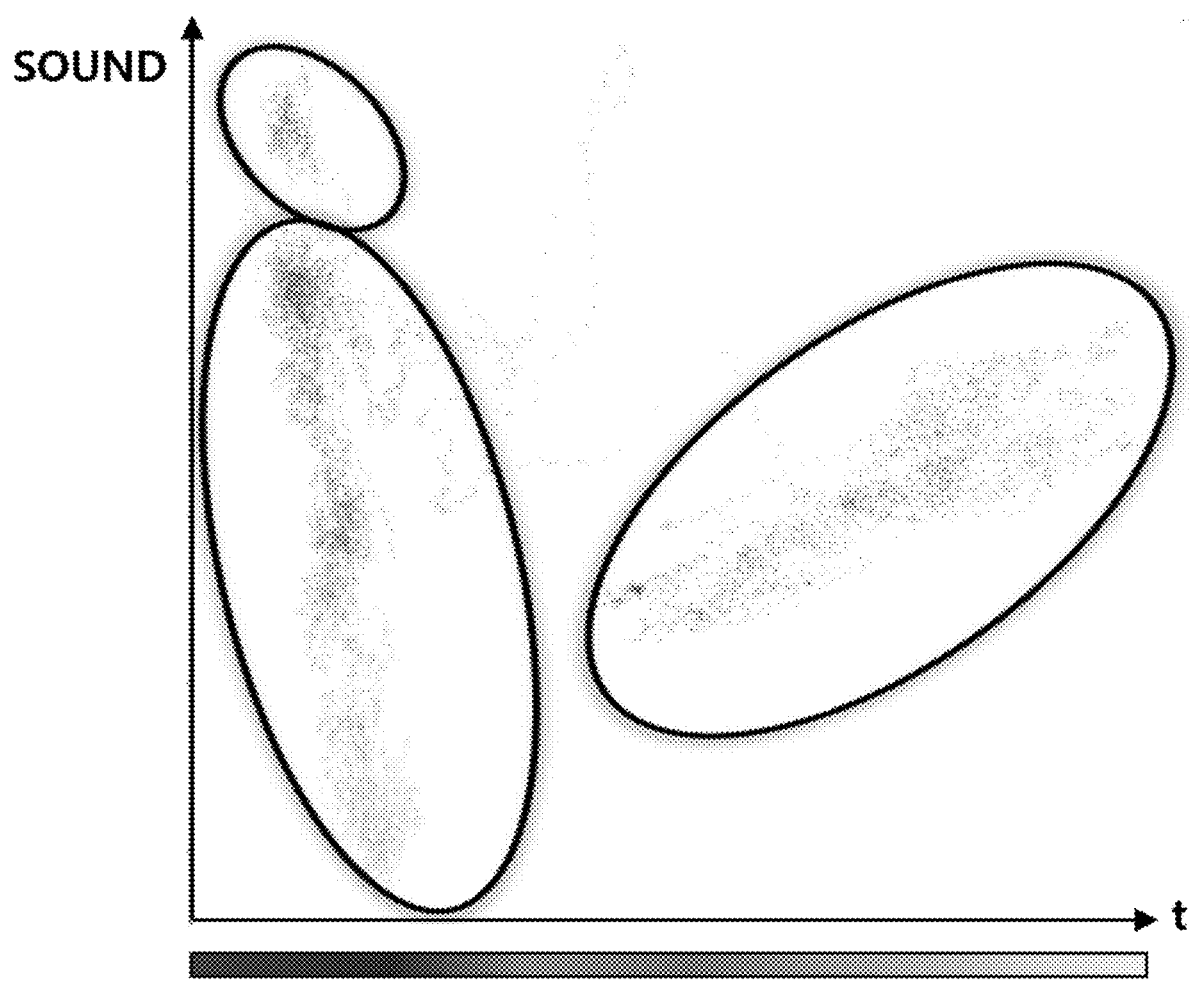
FIG. 3 is a schematic graph illustrating an operating method of an analysis part that systematizes an operating method of a vacuum pump based on sound information accumulated over time according to an embodiment of the disclosure.
Figure 4:
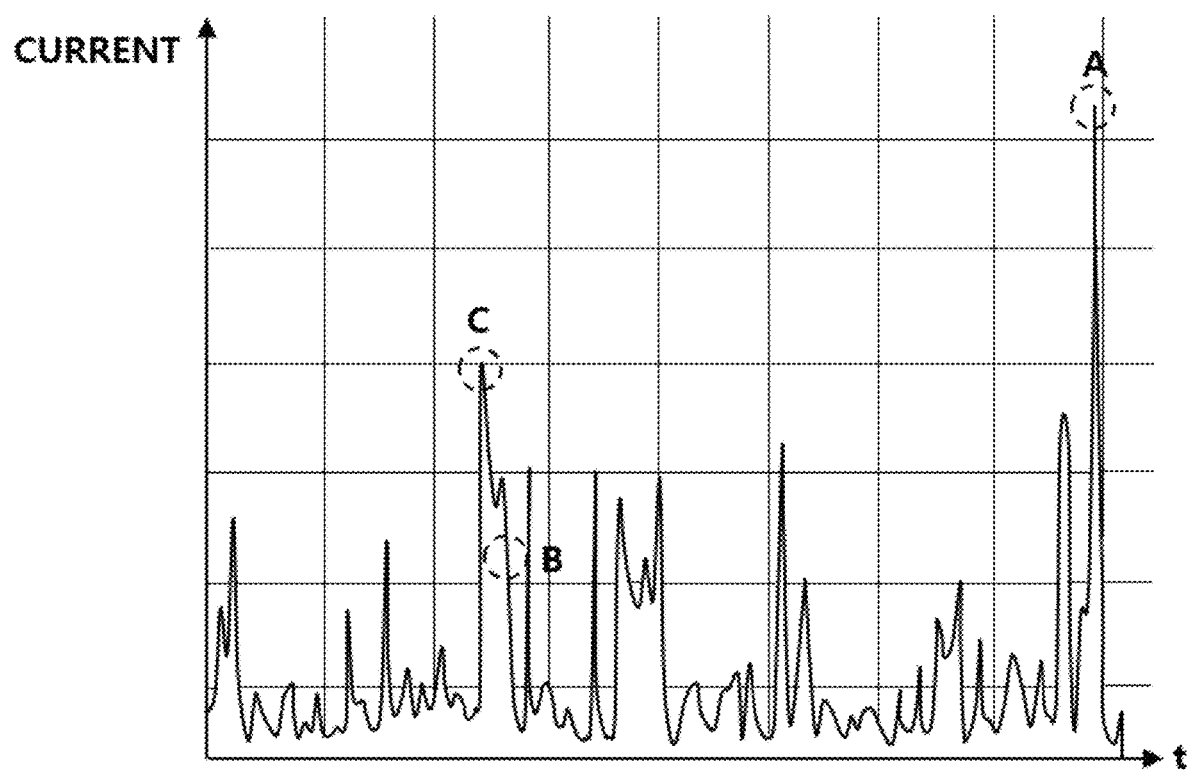
FIG. 4 is a schematic graph illustrating an operating method of an analysis part that selects a peak value in an abnormal state of current which is measured by a current sensor over time according to an embodiment of the disclosure.

FIG. 1 is a schematic diagram illustrating a fault detection system 10 for a vacuum pump according to an embodiment of the disclosure, FIG. 2 is a schematic diagram illustrating a method of selecting any one from sound patterns collected by at least two acoustic sensors 110 in the fault detection system 10 for a vacuum pump, FIG. 3 is a schematic graph illustrating an operating method of an analysis part that systematizes an operating method of a vacuum pump P based on sound information accumulated over time according to an embodiment of the disclosure, and FIG. 4 is a schematic graph illustrating an operating method of an analysis part that selects a peak value in an abnormal state of current measured by a current sensor 130 over time according to an embodiment of the disclosure.

Hereinafter, a configuration and operation relationship of the disclosure will be described with reference to FIGS. 1 to 4.

A vacuum pump P according to an embodiment of the disclosure may be formed to be a state in which gas pressure in a specific space such as an inside of a chamber (not shown) is lower than atmospheric pressure, that is, a state in which molecular density is low. The vacuum pump P may suction a fluid such as liquid, gas, other particles, or the like. In case that the vacuum pump P is driven, the inside of the chamber (not illustrated) may be formed to be a vacuum state of a certain vacuum capacity.

Types and quantities of vacuum pumps P used according to a process and a type of equipment are different from each other.

In an embodiment, the vacuum pumps P may be formed as different vacuum pumps for each capacity unit of low vacuum, medium vacuum, high vacuum, and ultra-high vacuum. In another embodiment, the vacuum pump P may be provided as one and more vacuum pumps P in order to form a same vacuum capacity unit at a same time. In still another embodiment, a pump with an appropriate type and quantity may be selected as the vacuum pump P, from among a claw pump, a roots pump, a scroll pump, a screw pump, a multi-stage roots pump, a hybrid type pump such as a combination of the roots pump and the claw pump, and the like, depending on a specific manufacturing apparatus. However, the vacuum pump P is not limited to the above-described embodiments.

The fault detection system 10 for a vacuum pump according to the embodiment of the disclosure may predict whether at least one vacuum pump P is faulty in a production line that proceeds in a unit of at least one process, to track and manage maintenance and replacement timing of the vacuum pump P.

Referring to FIGS. 1, 3, and 4 again, the fault detection system 10 for a vacuum pump may include an acoustic sensor 110 and a processor 200, and further include a vibration sensor 120, a current sensor 130, and a central management server or cloud server 300.

Referring to FIGS. 1 to 3 again, the acoustic sensor 110 may detect sounds that are inevitably generated during operation of the vacuum pump P. The acoustic sensor 110 may periodically track the sounds generated by the vacuum pump P to provide a determination criterion for determining whether the vacuum pump P is faulty.

The acoustic sensor 110 may detect sounds of the vacuum pump P and collect a sound pattern. The acoustic sensor 110 may be provided adjacent to the vacuum pump P in order to detect the sounds generated by the vacuum pump P. The sound pattern may be sound information during a certain period. The sound pattern may be reference information for determining whether the operation of the vacuum pump P is irregular.

In case that defects occur in parts, such as a motor, a gear, and a bearing, of the vacuum pump P, the sound pattern may be changed due to a change in rotational speed or the like, and the acoustic sensor 110 may provide a sound pattern that is reference data capable of determining whether the vacuum pump P is faulty based on the changed sound pattern.

In an embodiment, the acoustic sensor 110 may be provided as at least two acoustic sensors 110. Different acoustic sensors 110 may be maintained at different distance intervals from any one vacuum pump P. The acoustic sensors 110 may each be disposed to be adjacent to a corresponding portion for each portion which is intended to measure the sound of the vacuum pump P. Any one acoustic sensor 110 may be disposed to correspond to two or more vacuum pumps P.

The acoustic sensor 110 may include an amplification part and a converter.

The amplification part may amplify received sounds to form a sound pattern having a constant waveform. The amplification part may amplify sounds and standardize the amplified sounds to form a sound pattern of a certain time period having a constant frequency bandwidth and amplitude.

The converter may convert the amplified sound pattern into a digital signal.

The acoustic sensor 110 may transmit different sound patterns to the processor 200 through a data input/output interface.

Referring to FIG. 1 again, the vibration sensor 120 may detect vibrations of the vacuum pump P and collect a vibration pattern. The vibration pattern may be reference information for determining whether the operation of the vacuum pump P is irregular. The vibration sensor 120 may provide a vibration pattern for detecting a sign of an abnormality during the operation of the vacuum pump P and predicting a mechanical fault of the vacuum pump. Since it is difficult to ensure objectivity in determining whether the vacuum pump P is faulty merely with the sound pattern of the acoustic sensor 110, the vibration sensor 120 may be auxiliary reference information. Based on the vibration pattern provided by the vibration sensor 120, the vibration sensor 120 may further increase the accuracy of whether the vacuum pump P is faulty.

The vibration sensor 120 may be provided to be in contact with the vacuum pump P in order to detect the vibrations generated by the vacuum pump P. The vibration sensor 120 may be attached to a surface of the vacuum pump P. For example, the vibration sensor 120 may be attached to a part such as a rotor, a gear box, a bearing, etc. of the vacuum pump P at a specific position.

The vibration sensor 120 may include an amplification part and a converter.

The amplification part may amplify received vibrations to a vibration pattern having a constant waveform.

The converter may convert the amplified vibration pattern into a digital signal.

Referring to FIGS. 1 and 4 again, the current sensor 130 may measure a current applied to the vacuum pump P. The current sensor 130 may measure a current value applied to the vacuum pump P and provide the measured current value for predicting a mechanical fault of the vacuum pump based on a current value above a certain level. Since it is difficult to ensure objectivity in determining whether the vacuum pump P is faulty merely with the sound pattern of the acoustic sensor 110, the current sensor 130 may be auxiliary reference information. Based on a strength and waveform of the current provided by the current sensor 130, the current sensor 130 may further increase the accuracy of whether the vacuum pump P is faulty.

Referring to FIG. 4, the current measured by the current sensor 130 may be displayed in the form of a graph over time period. For an example, a current spectrum of FIG. 4 discloses a current applied to a specific vacuum pump P with a maximum amplitude over time on an X-axis.

Referring to FIG. 1 again, a thermal sensor 140 may measure a temperature to determine whether a temperature rise range deviates from a reference temperature range during the operation of the vacuum pump P. The thermal sensor 140 may be provided to be in contact with or not to be in contact with the vacuum pump P. Since it is difficult to ensure objectivity in determining whether the vacuum pump P is faulty merely with the sound pattern of the acoustic sensor 110, the thermal sensor 140 may be auxiliary reference information. Based on temperature change value of a certain time period and the measured temperature above a certain temperature provided by the thermal sensor 140, the thermal sensor 140 may further increase the accuracy of whether the vacuum pump P is faulty.

Referring to FIG. 1 again, a laser displacement sensor 150 may measure a position value of the vacuum pump P in order to determine whether a position shift of the vacuum pump P occurs due to the vibration generated during operation of the vacuum pump P. The laser displacement sensor 150 may be provided to be in contact with or not to be in contact with the vacuum pump P. Since it is difficult to ensure objectivity in determining whether the vacuum pump P is faulty merely with the sound pattern of the acoustic sensor 110, the laser displacement sensor 150 may be auxiliary reference information. Based on the position deformation or not, deviation information on the position shift, and the like, which are provided by the laser displacement sensor 150, the laser displacement sensor 150 may further increase the accuracy of whether the vacuum pump P is faulty.

whether the position is changed, deviation information on the position shift, and the like, which are measured by the laser displacement sensor 150 may be auxiliary reference information for increasing the accuracy of determining whether the vacuum pump P is faulty.

The laser displacement sensor 150 may include a light emitter and a light receiver, and it is possible to detect whether the position of the vacuum pump P is changed and an amount of position shift based on a value returned to the light receiver after a light source of the light emitter irradiates the vacuum pump P with light.

Referring to FIGS. 1 and 2 again, the processor 200 may analyze different pieces of measurement information such as a sound pattern, a vibration pattern, a current, heat, a position change, and the like to identify whether the vacuum pump P is faulty. The processor 200 may use the sound pattern as a fault detection reference value, and additionally acquire reference information on the vacuum pump P, such as a vibration pattern, a current, heat, a positional deviation, or the like, to use the reference information as a preliminary fault detection reference value.

The processor 200 may include an analysis part 210, a noise removal part 220, and a fault identification part 230. The processor 200 may detect whether the vacuum pump P is abnormal in a customized manner in which an optimized parameter for each vacuum pump P having different specifications is selected, added, or subtracted.

The processor 200 may selectively operate or change each product with an apparatus standard in which the product is used or a preset standard according to a preset analysis tool.

The analysis part 210 may analyze a signal waveform of a digital signal. The analysis part 210 may collect each numerical value, such as an amplitude, a frequency range, and the like, of the digital signal. In an embodiment, the analysis part 210 may set different frequency ranges to vacuum pumps P having different specifications.

In an embodiment, the analysis part 210 may adjust, compress, and encrypt each numerical value in a bandwidth required for signal waveform analysis. The analysis part 210 may analyze the number of times the operation of the vacuum pump P is stopped and the sound pattern, the vibration pattern, and the current after the operation is resumed, and generate a replacement signal of the vacuum pump P.

Further, the analysis part 210 may group and store sound patterns having different waveforms, which are collected during the time during which the vacuum pump P is operating. The analysis part 210 may make big data of sound patterns in different operating states of the vacuum pump P, such as a state in which the vacuum pump P is normally operated, a state in which the vacuum pump P is abnormally operated, and further, a state in which the vacuum pump P is faulty. The analysis part 210 may update the sound patterns with additional updates other than values predefined for the normal state, the abnormal state, and the fault state.

The analysis part 210 may calculate quantified parameters for vibration patterns, currents, heat, and position changes in addition to the sound patterns in the sound patterns in the normal operation state, the abnormal state, and the fault state. The analysis part 210 may store data for each of the normal operation state, the abnormal state, and the fault state. The data for the normal operation state may be information on a sound pattern, a vibration pattern, a current, a temperature, and a position while the vacuum pump P is normally operated. The data for the abnormal state may be information on a sound pattern, a vibration pattern, a current, a temperature, and a position in case that the vacuum pump P does not correspond to a fault state, but deviates from atypical data for the normal operation state. The data for the fault state may be information on a sound pattern, a vibration pattern, a current, a temperature, and a position, which corresponds in case that determining whether the vacuum pump P is faulty, among the data for the abnormal state.

The parameters of the vacuum pumps P include a sound peak value and a vibration peak value for each reference bandwidth, a measured temperature, a position change, a pumping speed (volume flow rate), maximum and minimum values of operating pressure, an applied current, power consumption, residual gas, etc. The analysis part 210 may calculate a normal operation parameter for the vacuum pump P in the normal operating state.

The analysis part 210 may analyze a replacement timing of the vacuum pump P based on a deep learning algorithm, another mathematics-based algorithm, or a determination algorithm based on an operator's experience. The analysis part 210 may realize a sophisticated analysis technique with an amount of training repeatedly accumulated over time by a deep learning manner.

The analysis part 210 may manage by accumulating and adding data on the parameters for the vacuum pump P after replacement of the specific vacuum pump P to the normal operation parameters accumulated immediately before for the vacuum pump P in case that replacement of the specific vacuum pump P.

The noise removal part 220 may remove noise from the sound patterns. The noise removal part 220 may remove an atypical sound out of in a reference range of the sound patterns collected by different acoustic sensors.

The fault identification part 230 may analyze the sound patterns to identify whether the vacuum pump P is faulty. The fault identification part 230 may analyze the sound patterns, and in cast that it is identified that the vacuum pump P is faulty, the fault identification part 230 may additionally call information on a vibration pattern, a current, heat, and a position change, may perform preliminary fault detection on the vacuum pump P based on the vibration pattern and the current value to re-detect and identify whether the vacuum pump P is faulty.

The fault identification part 230 may extract a fault factor by correlating the sound pattern with the information on the vibration pattern, the current, the heat, and the position change through a fault signal of the vacuum pump P. In case that it is identified that the vacuum pump p is faulty based on the sound pattern, the fault identification part 230 may display the fault on a display or notify the operator with an alarm sound and stop the operation of the vacuum pump p. Further, the fault identification part 230 may identify a cause of damage to the vacuum pump P and measure and predict a malfunction period of time according to the cause of the damage. The fault identification part 230 may select a parameter that is a major cause of the fault in case that predicting the fault. The fault identification part 230 may give a weight to the corresponding parameter to predict the fault with a higher frequency.

The fault identification part 230 may perform a fault detection on the vacuum pump P based on a deep learning algorithm, another mathematics-based algorithm, or a determination algorithm based on the operator's experience. In examining the fault detection of the vacuum pump P, the fault identification part 230 may examine in conjunction with detection factors of the vacuum pump P, such as bearing wear, shaft misalignment, damage to a gear tooth surface, rotor imbalance, stator malformation, unbalanced air gap, loose support, dynamic eccentricity, static eccentricity, voltage imbalance, current imbalance, leakage factor detection, cavitation detection, pressure loss evaluation, hammering detection, flow quality evaluation, and the like.

The central management server or cloud server 300 may collect status information of different vacuum pumps P from the processor 200. The central management server or cloud server 300 may monitor vacuum pumps P. The central management server or cloud server 300 may control the operations of the vacuum pumps P by accessing the processor 200 in a cloud computing method.

Referring to FIG. 2 again, the manufacturing apparatus may include at least one chamber (not illustrated) and may be connected to at least one vacuum pump P. The manufacturing apparatus may provide a space in which the process proceeds.

The chamber (not illustrated) may provide a closed space for constantly maintaining a vacuum state formed by the vacuum pump P.

According to the embodiments of the disclosure, it is possible to diagnose and detect a sign of an abnormality of a vacuum pump in advance on the basis of noise inevitably generated by the vacuum pump.

According to an embodiment of the disclosure, by predicting whether a vacuum pump is faulty, it is possible to promote stable operation of a manufacturing apparatus and increase a service life of the manufacturing apparatus including the vacuum pump.

According to another embodiment of the disclosure, by realizing, by a processor by itself, management of a vacuum pump in an edge computing method on the basis of a sound pattern, a vibration pattern, a current, heat, an amount of position change, etc. generated during operation of the vacuum pump, it is possible to improve data processing efficiency and increase security.

According to still another embodiment of the disclosure, by preparing for, by an analysis part, an abnormal state of a vacuum pump by accumulating and training data using a deep learning algorithm, another mathematics-based algorithm, or a determination algorithm based on an operator's experience, it is possible to ensure accuracy in determining a need for maintenance and replacement of the vacuum pump.

According to yet another embodiment of the disclosure, it is possible to predict individual maintenance and replacement intervals for each of vacuum pumps with different installation information, operation information in different usage modes, and the like, in consideration of the characteristics of vacuum pumps, thereby increasing work efficiency.

The above description is an example of technical features of the disclosure, and those skilled in the art to which the disclosure pertains will be able to make various modifications and variations. Therefore, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A fault detection system for a vacuum pump, comprising:
    an acoustic sensor configured to detect sounds, generate a sound pattern from the sounds, and collect the sound pattern;
    a vibration sensor configured to detect vibrations and collect a vibration pattern from the vibrations;
    a current sensor configured to measure a current applied to the vacuum pump;
    a laser displacement sensor that measures a position value of the vacuum pump and detects position variations of the vacuum pump based on the position value; and
    a processor that identifies a failure of the vacuum pump by analyzing the acoustic pattern, the vibration pattern, the current, the heat, and the position variations using an edge computing method,
    wherein the processor uses the acoustic pattern as a fault detection reference value, while using the vibration pattern, the current, and the position variations as auxiliary reference information, and
    wherein the processor may select a parameter that is a major cause of the fault in case that predicting the fault and the processor may give a weight to the corresponding parameter to predict the fault with a higher frequency.

2. The fault detection system of claim 1, wherein the processor performs an analysis of the sound pattern based on time in a state during operating the vacuum pump to detect a fault of the vacuum pump.

3. The fault detection system of claim 1, further comprising:
    wherein the processor performs a fault identification part calling operations of the vibration sensor and the current sensor in case that the sound pattern of the vacuum pump is greater than or equal to a preset threshold value.

4. The fault detection system of claim 3, wherein the processor changes values of the sound pattern, the vibration pattern, and the current at an arbitrary time period to be tracked in case that a fault of the vacuum pump is detected.

* * * * *